Dec. 13, 1966  E. E. GRAY  3,291,884
RADAR SIMULATOR

Filed May 7, 1964  3 Sheets-Sheet 1

INVENTOR
EDWARD E. GRAY

BY
ATTORNEY

INVENTOR.
EDWARD E. GRAY

Dec. 13, 1966  E. E. GRAY  3,291,884
RADAR SIMULATOR

Filed May 7, 1964  3 Sheets-Sheet 3

INVENTOR.
EDWARD E. GRAY
BY
ATTORNEY

United States Patent Office 3,291,884
Patented Dec. 13, 1966

3,291,884
RADAR SIMULATOR
Edward E. Gray, Palo Alto, Calif., assignor to General Precision, Inc., Binghamton, N.Y., a corporation of Delaware
Filed May 7, 1964, Ser. No. 365,746
5 Claims. (Cl. 35—10.4)

This invention relates to a radar simulator and more particularly to an improved radar simulator for providing increased target breakup and directivity effects, in order to more effectively simulate radar returns from man-made structures.

For the past several years, aircraft and other vehicle simulators have been designed which, in general, include a grounded realistic reproduction of the control areas of such vehicles, together with the necessary operating controls and indicating devices. Associated with the control area is one or more analog or digital computers, or a combination of both, adapted to accept electrical inputs in accordance with the settings of various ones of the controls as adjusted by the student operator or trainee, and to rapidly derive therefrom further electrical signals representative of the necessary inputs for the indicating and other devices. In this manner the student operator is competently trained in the proper operation and control of the vehicle, without incurring the inherent dangers and risks resulting from the operation and control of the actual vehicle.

More recently, particularly with respect to aircraft simulators, vehicle simulators or other training apparatuses include simulation of one or more equipments normally installed in such vehicles which may include an auxiliary equipment such as a radar.

Aircraft radar equipment normally includes a transmitter of electromagnetic energy pulsed at a predetermined rate and a receiver which responds to the reflected portion of the transmitted energy incident upon an object or terrain. The output of the radar receiver is coupled to a cathode ray tube (CRT) which, in accordance with a preselected electron beam scanning pattern, presents a map-like representation of the objects intercepted by the transmitted energy.

The simulation of an actual aircraft radar equipment is accomplished, in general, by employing at least one flying spot scanner (FSS) or other light source to synchronously scan a pair of photographic transparencies, wherein the gray scale of a first of the transparencies is encoded in accordance with radar reflectance information and a second of the transparencies is encoded with elevation information. The modulated light passing through the transparencies is thereafter converted to video signals and operated upon to provide input signals for a CRT display device or console. Specifically, Patents Nos. 3,031,774 and 3,113,989 describe and claim a radar simulator which provide apparatuses for calibrating the optical to electrical signal transducers employed as well as calibrating the gray scale of the film which may vary from transparency to transparency as a result of the photographic developing process. Additionally Patent No. 3,067,526 describes and claims an apparatus for modifying the video signal applied to the CRT in accordance with computed elevation information to provide shadow areas behind large terrain proturberances such as mountains, and Patent No. 3,100,238 describes and claims an apparatus to further improve the quality of a simulated radar display by modifying the video signal in accordance with the various angles of incidence of the simulated radar beam upon the terrain features which may be computed from the elevational information encoded upon the elevation transparency.

It has been difficult until now, however, to properly provide shadow areas behind relatively low man-made objects such as buildings or other structures, because of the limitations inherent in the gray scale employed in the elevation channel. The information encoded on the elevation transparency must represent simulated altitudes between sea level and 30,000 feet or more, in order to properly encompass large scale mountain ranges, and because only a limited number of variations in the gray scale are possible, the necessary altitude range must be covered in steps.

As briefly outlined above, radar simulators of the prior art generally provide for the simultaneous scanning of a map transparency having elevational data thereon and of another map transparency having radar reflectance data thereon. The video signal obtained from the radar reflectance channel is modified by a shadow computation and by an aspect computation and is displayed on a CRT. A signal obtained from the elevation channel is applied to a shadow computer in accordance with the teachings of Patent No. 3,067,526. The shadow computer generates a signal for blanking the video signal of the reflectance channel during those times when the elevation scanning signal has a negative differential or slope representing shadow errors behind large terrain objects such as mountains. The aspect angle computer strengthens or weakens the video signal of the reflectance channel in accordance with the computed angle of incidence of the simulated radar beam in accordance with the teachings of Patent No. 3,100,238, by way of example. Thus, in the simulated radar display the near side of a mountain or other relatively large object is exaggerated by strong signals, and the area behind the mountain is blanked simulating a radar shadow.

The radar simulators of the prior art have been unable to adequately simulate radar returns from buildings and man-made structures because the height of such buildings is only 100 feet, more or less, and is not a sufficient elevation change to be recorded on the map transparency bearing the elevational data, and the video signals derived from urban areas are not broken by bright leading edges and shadows as in an actual radar return.

According to the present invention, however, use is made of the data in the reflectance channel to generate artificial signals which thereafter are combined with the computed elevation data to provide a resultant signal to the shadow and aspect angle computers to more realistically simulate an actual radar when overlooking man-made buildings and structures. Briefly, a comparator network is employed to monitor the reflectance signal and to compare this signal with a constant voltage. The constant voltage is adjusted to a predetermined value, as more particularly hereinafter described, such that the comparator provides no signal unless the reflectance value of the simulated radar return increases to or exceeds a value representative of urban areas and man-made structures.

When the reflectance signal becomes relatively high, indicating a building or other structure, it is sensed by the comparator, and a pulse is generated of known amplitude with a duration corresponding to the time period during which the reflectance return is equal to or in excess of the value representative of urban areas and man-made structures. This pulse is fed to the input of the transmission slope compensator network and is summed with the elevation signal. The elevation signal then appears with a pulse of increased amplitude added thereto. This pulse appears as a small but well defined high point and affects both the shadow computer and the aspect angle computer. The pulse added to the elevation signal therefore has the effect of adding a 100–200 foot increment on top of the normal elevation, and is effective to create an artificial prominence on the terrain. In accordance with this artificial prominence, the aspect angle computer and the shadow computer introduce a bright leading edge followed by the shadow effect to provide a more realistic simulated radar display, all as more particularly hereinafter described.

It is an object of the invention, therefore, to provide a radar simulator.

Another object of the invention is to provide an improved radar simulator for providing increased target breakup and directivity effects.

A further object of the invention is to provide an improved radar simulator to more effectively simulate radar returns from man-made structures.

Still another object of the invention is to provide an improved terrain radar simulator to more realistically display buildings and other man-made structures.

Yet another object of the invention is to provide improved terrain radar simulator wherein the displayed video signals derived from urban areas are broken by bright leading edges and shadows as in an actual radar return.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawing, in which.

Figure 1:
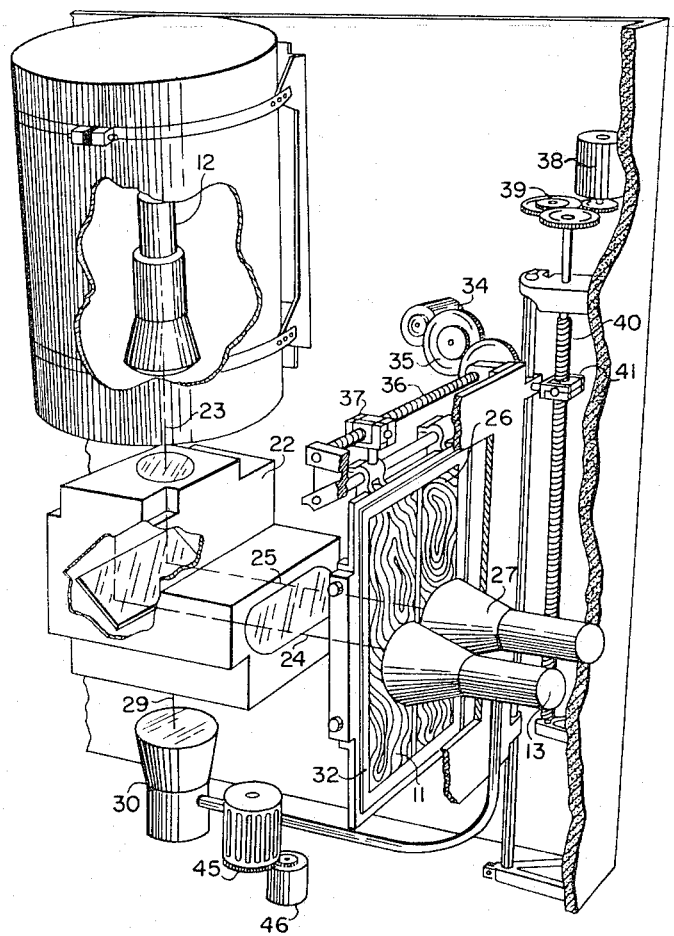
FIG. 1 is a perspective view of one embodiment of the radar simulator of the invention.

Referring now to the drawings, an embodiment of the improved radar simulator of the invention is illustrated in FIG. 1. As there shown, a flying spot scanner 12 projects a scanning spot upon an optical system 22 which splits an initial beam of light 23 into two beams 24 and 25. Beam 24 passes through a photographic plate 11 having contour information thereon and is received by a photo multiplier 13. Beam 25 passes through another photographic plate 26 having terrain reflectance information thereon and is received by another photo multiplier 27. Yet another beam of light 29 is focused upon a third photo multiplier 30 without passing either of the photographic plates 11 or 26.

The photograph transparencies 11 and 26 are prepared, by way of example, by a successive stripping technique or process wherein a contour map is photographed, and the photographic emulsion is removed in selected areas between contour lines of the map. The stripping process is alternated with further exposures of the map area upon diapositive transparencies, and further contour elevational areas may be stripped away. If the areas of highest elevation are first stripped from the negative and first exposed on the positive film, the regions of high elevations will be comparatively dark, while the regions of low elevation will be comparatively light. Thus, the film plates 11 and 26 contain the map information in various shades of gray representative of both contour information and radar reflectance information. This technique for preparing photographic plates is fully described in a bulletin entitled, "Dystrip Technique of Color Separation," published by the Aeronautical Chart and Information Center, Air Photographic and Charting Service (MATS).

Figure 2:
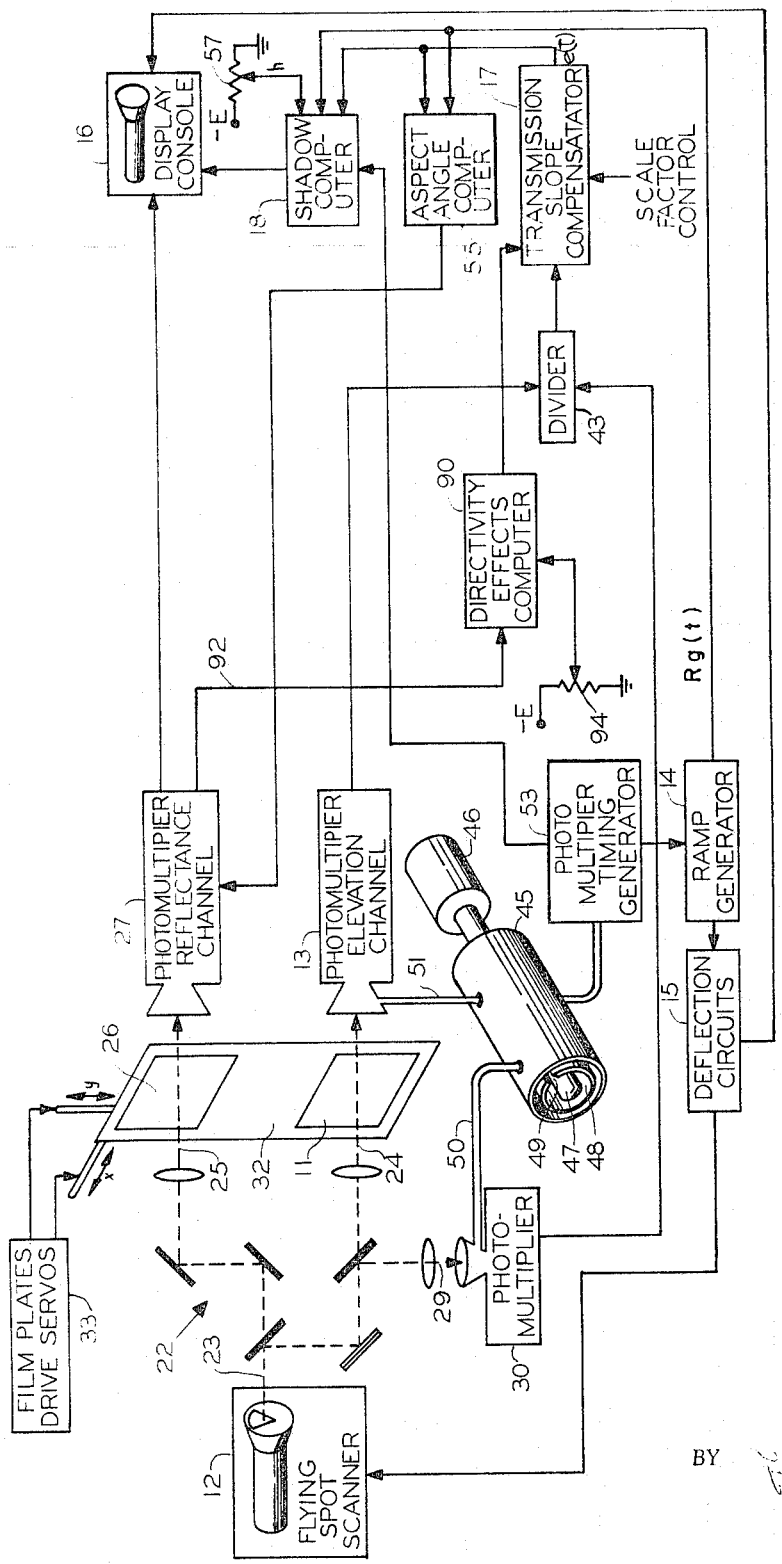
FIG. 2 is a schematic diagram of the embodiment of the invention illustrated in FIG. 1.

The film plates 11 and 26 are mounted side by side on a single carriage 32 which is capable of two dimensional, X–Y, movement. As the simulated aircraft moves, the film plates are moved by the film plate drive servos (see FIG. 2). As shown in FIG. 1, the X drive includes a motor 34 coupled through a gear chain 35 to a lead screw 36. As lead screw 36 rotates, a lead nut 37 is caused to move horizontally along the lead screw, and a carriage 32 is likewise shifted horizontally. The Y drive includes a motor 38 coupled through a gear train 39 to rotate another lead screw 40. As lead screw 40 rotates, a lead nut 41 is moved vertically therealong and carriage 32 is likewise moved vertically. Thus, the simulated aircraft is movable in two dimensions across the map area.

The intensity of the spot of light of the FSS 12 generally varies considerably because of the non-uniformity of the phosphor layer thereon or because of variations of the response characteristics of various phosphors in that layer. Photo multiplier 30 is positioned to continuously monitor the intensity of beam 29 which corresponds directly with the intensity of the scanning spot, and the output from photo multiplier 30 is passed to an analog divider circuit 43 (see FIG. 2). Analog divider circuit 43 receives and corrects the video signal from photo multiplier 13 to provide an output video signal which is not dependent upon the instantaneous intensity of the scanning spot and which is not subject to the variations thereof. A transmission slope compensator network 17 is essentially an operational amplifier having certain non-linear characteristics which complement non-linearities in the photographic processing of plate 11, commonly known as the H and D correction for the photographic process. The video signal passed from transmission slope compensator 17 to a shadow computer 18 is corrected for both variations in the intensity of the scanning spot and photographic non-linearities of film plate 11. A full description of photographic film or plate scanning, and correction for non-linearities therein is disclosed in U.S. Patents Nos. 3,031,774 and 3,113,989, supra.

Additionally, photo multipliers 13 and 30 are subject to drift variations which result in further inaccuracy in the video signal. These photomultipliers, therefore, are calibrated between each scanning operation by a light chopper arrangement 45 driven by a synchronous motor 46. A light source 47 is positioned within a rotating cylinder 48 having a peripheral slit, or aperture, 49. Each time aperture 49 comes into alignment with a pair of light pipes, such as lucite rods, 50 and 51, which normally occurs during each retrace time interval, a standard light source is applied to calibrate photomultipliers 13 and 30. A more detailed description of photo multiplier calibrators of this type is found in above referenced Patent No. 3,113,989. Further, light chopper 45 is coupled to a timing pulse generator which furnishes the necessary timing pulses for the improved radar simulator of the invention. Thus, it should be appreciated that all of the circuits herein described are timed in accordance with light chopper 45 controlled by the operation of synchronous motor 46.

The corrected elevation signal $e(t)$ is delivered from transmission slope compensator network 17 to both a shadow computer 18 and an aspect angle computer 55. Shadow computer 18 provides a selective banking of the video signals from the reflectance channel 27 to represent the shadow area behind a terrain feature such as a mountain. Further, because some of the actual radars to be simulated are intended for low altitude useage, shadows are computed for radar line of sight angles both above ($\lambda$) and below ($\rho$) the altitude of aircraft horizontal. This is necessary since many terrain features, which may cause shadowing, are higher than the simulated aircraft.

For the terrain below the aircraft altitude, the following expression is computed:

$$\log \tan \rho = \log \frac{Rg(t)}{h - e(t)} \qquad (1)$$

wherein $Rg(t)$ is the instantaneous ground range derived from a linear saw tooth or ramp from ramp generator 14, $h$ is an altitude signal representative of the altitude of the simulated aircraft above sea level, and for any particular scanning operation, this value is constant and is derived from a voltage source such as potentiometer 57 which is set in accordance with the assumed altitude of the simulated aircraft, and $e(t)$ is the corrected elevation signal provided by transmission slope compensator network 17.

This computation is obtained by use of wideband operational amplifiers with logarithmic feedback networks. The computer detects whenever log tan $\rho$ goes through a maximum, i.e., when the slope of log tan $\rho$ changes sign. Shadow blanking begins when a maximum occurs and ends when the function log tan $\rho$ returns to its value at the beginning of the shadow blanking. A maximum in lo gtan $\rho$ is detected by a voltage comparator which receives two inputs, log tan $\rho$ and (log tan $\rho$) memory. As long as log tan $\rho$ occurs, (log tan $\rho$) memory exceeds log tan $\rho$, and a shadow blanking pulse is generated at the output of the voltage comparator. For terrain above the aircraft altitude, log tan $\lambda$ is computed in the same manner as log tan $\rho$. A shadow blanking pulse is generated in the same manner as outlined above, that is when log tan $\lambda$ goes through a maximum. Note should also be made of the fact that the computed expression $h-e(t)$ is the actual height of the simulated aircraft above the terrain, and this quantity, sampled by a sampling pulse from timing generator 53 at the start of each scan, can be employed to provide the necesary input signals for a simulated radar altimeter, if desired. An example of a shadow computer is more completely described in the above referenced Patent No. 3,067,526.

Aspect angle computer is effective to rapidly modify the reflectance channel video signal in accordance with a computed cosine function of the angle of incidence between incremental areas of the simulated terrain and the simulated radar beam obtained from the elevational information. Aspect angle computer 55 also receives the signals received by the shadow computer, namely $Rg(t)$, $h$, and $e(t)$. The height of the simulated aircraft above the scanned incremental area of the terrain is then computed as the difference between the altitude and the terrain elevation, $h-e(t)$, and the tangent of an angle $\lambda$ extending upwardly to the aircraft from the horizontal is computed as the ratio between this difference quantity and the ground range, $$\frac{h-e(t)}{Rg(t)}$$

the elevation signal $e(t)$ is differentiated to obtain a further signal, $$\frac{t}{dt}e(t)$$

representing the terrain slope at the incremental area being scanned and equal to the tangent of an angle $\beta$. The cosine of the angle of incidence, $\gamma$, is computed by analog methods from the tangent functions of the angles $\lambda$ and $\beta$. The reflectance video signal is next effectively multiplied by the cosine of the angle of incidence $\alpha$ to obtain a modified video which is impressed upon the CRT within display console 16 in accordance with known techniques to provide a simulated radar display wherein certain terrain features are exaggerated and others are diminished in accordance with the various angles of incidence of the simulated radar beam upon the terrain features, representative signals of which are derived from plate 11. Further details of an angle aspect computer are to be found in heretofore referenced Patent No. 3,100,238.

While radar simulators including one or more of the above brieflly described systems have proven satisfactory for many installations, the radar simulators of the prior art have been deficient in providing edge breakup and shadow areas as displayed on an actual radar CRT display when the radar beam is scanning urban areas. In order to overcome this deficiency, there have been proposed several complex systems such as storing the elevation on a multicolor transparency or to add a third photographic plate encoded with fine elevation data. Each of these propsed systems, however, result in reduced resolution capabilities and/or a significant increase in the complexity and reliability of the positioning device required to accurately locate the photographic plates with respect to the FSS, as well as the operative logic circuits employed therewith.

Referring now to FIG. 2 again, there is shown a directivity effects computer 90, coupled between reflectance channel 27 and transmission slope compensator 17. Directivity effects computer 90 provides more realistic breakup and directivity effects within target complexes, even though neither plate 11 nor plate 26 contains elevation data corresponding to the heights of typical structures within such target complexes. Additionally, the aspect angle and shadow computers, which as briefly described above, operate on changes in elevation data, are supplied with artificial elevation data which are equal in magnitude to the actual data derived from cultural targets. This feature is accomplished, according to the present invention, by directivity effects computer 90 which is effective, upon receipt of a signal from reflectance channel 27 in excess of a predetermined threshold, to provide an additional signal of suitable magnitude which is added to the normal elevation signal. Presence of this incremental signal, which is in the nature of a pulse having a duration equal to the time the reflectance signal exceeds the threshold level, causes the aspect angle and shadow computers to produce leading edge enhancement and shadowing within the target complexes.

It should be noted, and this is an important feature of the invention, that elevation data corresponding to buildings and other man-made structures are not encoded upon photographic plates 11 and 26, because in the preferred two transparency terrain radar simulators now being described, it is not feasible to encode, in the gray scale, the additional elevation steps necessary to obtain this resolution. However, by logically operating upon inherent data contained in reflectance transparency 26, artificial elevation signals, corresponding to the true elevational data, are generated which thereafter are employed in the radar simulator in the conventional manner. The incremental signal is representative of buildings and man-made structures having a height less than the contour interval of the transparency map which is scanned to obtain the elevation information. Therefore, the amplitude of the incremental, or building height, signal will be less than the variation of the elevational signals corresponding to a discrete gray-scale variation.

Figure 3:
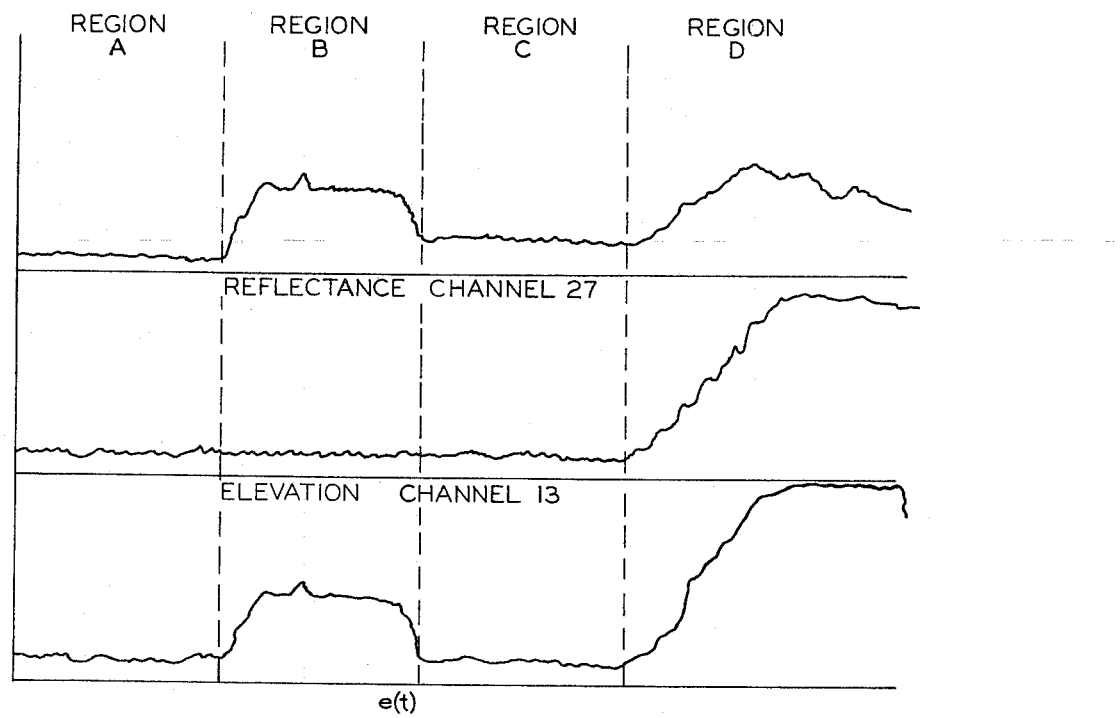
FIG. 3 illustrates typical idealized waveforms employed in the embodiment of FIG. 1.

For a better understanding of the present invention reference should now be made to FIG. 3, which illustrates typical idealized waveforms obtained in reflectance channel 27 and elevation channel 13 to simulate an actual radar scanning four contiguous regions identified as A, B, C, and D. Region A, in the example being illustrated in FIG. 3, denotes a water zone, region B is a target complex consisting of a number of buildings and other man-made structures such as those normally found at a sea side resort, region C is a relatively level section of land, and region D indicates a mountainous sector.

The reflectance signal shown in FIG. 3 exhibits a minimum value throughout region A, since the reflectance return from water is about 0.63%. Throughout region B, however, the reflectance return increases in amplitude, because of the number of buildings being scanned, and may vary in value between 30.2% and 69.2% corresponding to a #3, #2, or #1 return. Thereafter, throughout region C the signal in reflectance channel 27 decreases to about 7.41%, the typical return from land areas, and again increases through region D, as a result of the increased reflectivity provided a mountain or the like. Elevation channel 13, as shown in FIG. 3, is provided with an elevation signal of essentially constant magnitude, throughout regions A, B, and C, since the terrain changes, that is, water, buildings, and level land, do not present a sufficient change in height to be encoded on plate 11. The only variation in the elevation signal is that occurring in region D. Referring again now to Patent No. 3,067,526, it should be understood that the elevation data obtained from region D is effective, in accordance with other system parameters such as aircraft height and range, to provide, when applied to shadow computer 18 and aspect angle computer 55, video reflectance signals broken by bright leading edges and shadows as in an actual radar return. However, since the elevational data is substantially constant throughout regions A, B, and C, the increased target breakup and directivity effects are not normally provided for the buildings and man-made structures present in region B.

Through the use of directivity effects computer 90, coupled between an unmodified output from reflectance channel 27 provided along a line 92, and on input to transmission slope compensator network 17, artificial elevational data is provided in the absence of encoded elevational data which is added to the encoded elevation signal to attain the composite elevational signal labeled $e(t)$ in FIG. 3. It should now be understood, that when $e(t)$ is applied to the shadow and aspect angle computers, the CRT in display console 16 presents a more realistic simulated radar display of both buildings and terrain features because of the artificial elevation signal added to the encoded elevational data throughout region B.

Figure 4:
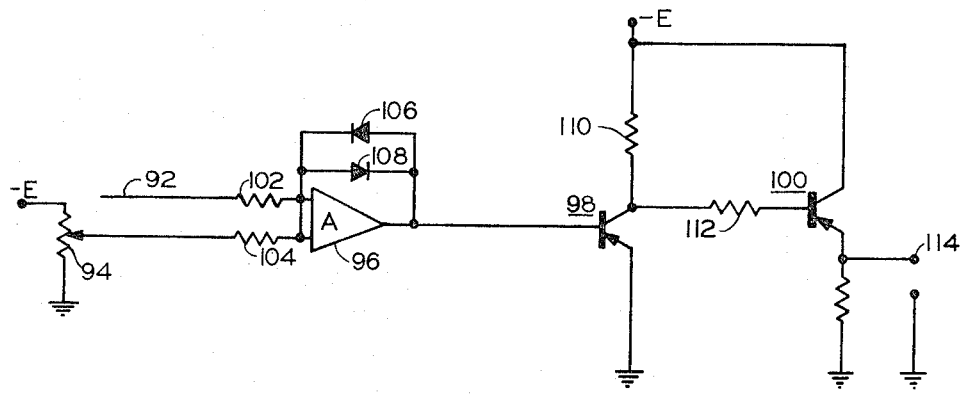
FIG. 4 is a schematic diagram of one embodiment of the directivity effects computer shown in FIG. 2.

Referring now to FIG. 4, there is illustrated a schematic diagram of one embodiment of directivity effects computer 90, it being understood that other and different logical circuits may be substituted therefor as desired. As there shown, the computer includes an amplifier 96 followed by a transistor 98 connected as a further amplifying stage, and another transistor 100 connected as an emitter follower. The unmodified reflectance signal along line 92 is impressed upon the summing junction of amplifier 96 through an input resistor 102, and a negative potential selected by potentiometer 94, connected between the —E supply and ground, is also impressed upon the summing junction through a resistor 104. Since the two input signals to amplifier 96 are opposite in polarity, the summing point may be either positive or negative depending upon the relative magnitudes of the two signals. When the signal on line 92 is greater in absolute magnitude than the voltage provided by potentiometer 94, the voltage at the summing point of amplifier 96 is positive. Amplifier 96 is selected to have non-inverting high gain, in order that the output voltage therefrom will be substantially positive when the input voltage is only slightly positive.

A pair of diodes 106 and 108 are connected as feedback paths for amplifier 96 and function to limit the output voltage of the amplifier. Thus, if the output tends to be substantially positive, diode 106 conducts, and if the output tends to be substantially negative, diode 108 conducts. The output of amplifier 96 is therefore held between voltage limits corresponding with the voltage drops across diodes 106 and 108. Such voltage drops are, in general, of the order of ½ volt, and therefore the output from amplifier 96 varies between plus ½ volt and minus ½ volt, depending upon which of the input signals is the greater.

The ½ volt positive or negative output from amplifier 96 is amplified substantially by transistor amplifier 98. Thus, when the voltage impressed upon the base electrode of transistor 98 is negative, the transistor conducts and the voltage drop across a load resistor 110 causes the collector potential to become less negative. This voltage is coupled through a resistor 112 to the base electrode of transistor 100 and is effective to cut off transistor 100 and the output therefrom, at a terminal 114, is substantially at ground potential. Conversely, when the biasing of transistor 98 is reversed, transistor 98 is cut off and emitter follower 100 conducts, effectively raising the emitter potential, and thereby the potential of terminal 114, to —E volts. In summary then, it should now be understood that, when the amplitude of the reflectance signal is less than the potential developed by potentiometer 94, directivity effects computer 90 has no effect on the signals displayed by console 16, but when the value of the reflectance signal exceeds the preset threshold, directivity effects computer 90 generates an artificial elevation which is summed with the normal elevation signal to provide edge breakup and shadow effects in those regions, such as region B of FIG. 3 by way of example, even though elevation variations corresponding to buildings and other man-made structures are not encoded on plate 11. Further, it should also be noted that other and different circuits may be employed in computer 90 rather than the specific arrangement hereinbefore described in detail, provided only that the overall function remains the same. Finally, it should further be noted that the invention is readily adaptable to other and different types of radar simulators and similar devices wherein the reflectance and elevational data initially originate in separate channels.

What has been described is an improved terrain radar simulator wherein use is made of data in the reflectance channel to generate artificial signals which thereafter are combined with computed elevation data to provide a resultant signal to the shadow and aspect angle computers to more realistically simulate an actual radar when overlooking man-made buildings and structures.

It will thus be seen that the objects set forth above, among those made apparent from the preceding description, are efficiently attained, and since certain changes may be made in the above construction without departing from the scope of the invention, it is intended that all matter contained or shown in the accompanying drawing shall be interpreted as illustrative and not in a limiting sense.

The embodiments of the invention in which an exclusive property or privilege is claimed are defined as follows:

1. A radar simulator comprising,
   a representation of radar terrain reflectance data;
   a representation of radar terrain elevational data;
   each of said representations being encoded as discrete gray scale variations upon a photographic transparency;
   means for simultaneously scanning corresponding regions of each of said representations to derive first and second electrical signals therefrom indicative of the terrain reflectance and terrain elevation, respectively;
   first circuit means responsive to said first electrical signal operable to generate a third electrical signal representative of building heights when said first electrical signal exceeds a predetermined threshold;
   summing means combining said second and third electrical signals to provide a fourth electrical signal representative of the terrain elevation combined with the building heights; and
   second circuit means responsive to said fourth electrical signal operable to break up said first electrical signal to simulate leading edges and shadows of buildings.

2. The simulator of claim 1 wherein said third electrical signal has a predetermined amplitude representative of a predetermined building height.

3. The simulator of claim 2 wherein said predetermined amplitude of said third signal is less than the variation in said second signal corresponding to a discrete gray scale variation.

4. A radar simulator comprising,
   a representation of radar terrain reflectance data;
   a representation of radar terrain elevational data;
   each of said representations being encoded as discrete gray scale variations upon a photographic transparency;

means for simultaneously scanning corresponding regions of each of said representations to derive first and second electrical signals therefrom indicative of the terrain reflectance and terrain elevation, respectively;

a comparator circuit having a pair of input terminals and an output terminal;

means connecting said first electrical signal representative of the terrain reflectance to one of said comparator input terminals and a reference potential providing a threshold value to the other of said comparator input terminals;

summing means combining said second electrical signal representative of the terrain elevation and the potential at the output terminal of said comparator to provide a third electrical signal representative of the terrain elevation combined with an increment of building height;

a radar display console;

means coupling said first electrical signal to said console; and means responsive to said third electrical signal operable to modify said coupled first electrical signal to thereby provide edge breakup and shadow effects in said radar display for both buildings and terrain features.

5. A radar simulator comprising, a photographic representation of radar terrain reflectance data;

a photographic representation of radar terrain elevational data;

means for scanning corresponding regions of each of said representations to derive first and second electrical signals therefrom commensurate with said terrain reflectance and terrain elevational data, respectively;

first circuit means responsive to said second electrical signal operable to intensify and blank said first electrical signal;

second circuit means responsive to said first electrical signal operable to incrementally increase said second electrical signal when said first electrical signal exceeds a predetermined value; and further circuit means operable to display said modified first electrical signal.

References Cited by the Examiner

UNITED STATES PATENTS 3,028,684  4/1962  Khanna et al. _____ 35—10.4

FOREIGN PATENTS 805,293  12/1958  Great Britain.

CHESTER L. JUSTUS, *Primary Examiner.*

MAYNARD R. WILBUR, *Examiner.*

T. H. TUBBESING, *Assistant Examiner.*